United States Patent
Iwama (10) Patent No.: US 10,574,038 B2
(45) Date of Patent: Feb. 25, 2020

(54) WIRE GRIPPER

(71) Applicant: NAGAKI SEIKI CO., LTD., Osaka (JP)

(72) Inventor: Tamotsu Iwama, Osaka (JP)

(73) Assignee: NAGAKI SEIKI CO., LTD., Osaka (JP)

( * ) Notice: Subject to any disclaimer, the term of this patent is extended or adjusted under 35 U.S.C. 154(b) by 0 days.

(21) Appl. No.: 14/650,678

(22) PCT Filed: Dec. 9, 2013

(86) PCT No.: PCT/JP2013/007218
§ 371 (c)(1),
(2) Date: Jun. 9, 2015

(87) PCT Pub. No.: WO2014/103195
PCT Pub. Date: Jul. 3, 2014

(65) Prior Publication Data
US 2016/0218493 A1    Jul. 28, 2016

(30) Foreign Application Priority Data
Dec. 27, 2012 (JP) .................................. 2012-286230

(51) Int. Cl.
*H02G 1/02* (2006.01)
*H02G 1/04* (2006.01)
*H02G 1/00* (2006.01)

(52) U.S. Cl.
CPC .............. *H02G 1/005* (2013.01); *H02G 1/04* (2013.01)

(58) Field of Classification Search
CPC ................................ H02G 1/005; H02G 1/04
(Continued)

(56) References Cited

U.S. PATENT DOCUMENTS

| 531,700 | A | * | 1/1895 | Rowland | .................. F16G 3/006 24/132 R |
| 935,013 | A | * | 9/1909 | Gilchrist | .................. B30B 9/323 100/233 |

(Continued)

FOREIGN PATENT DOCUMENTS

| CA | 2351521 A1 | * | 6/2000 | ............... H02G 1/04 |
| CH | 622131 A5  | * | 3/1981 | ............. B25B 1/241 |

(Continued)

OTHER PUBLICATIONS

International Search Report, dated Jan. 28, 2014.

*Primary Examiner* — Joseph J Hail
*Assistant Examiner* — J Stephen Taylor
(74) *Attorney, Agent, or Firm* — Greenblum & Bernstein, P.L.C.

(57) ABSTRACT

Provided is a wire gripper which is capable of efficiently supplying a gripping force without inviting an increase in size and weight. A wire gripper grips a sheathed wire which is illustrated by an imaginary line. The wire gripper has a base part which pivotally supports link pieces on the lower side thereof so as to be swingable. The link pieces have ends, respectively, both of which are coupled to an operating arm so as to form a parallel link. Illustrated are an upper gripping body (a first gripping body) and a lower gripping body (a second gripping body), by which the sheathed wire is sandwiched. Of the gripping bodies, the upper gripping body is secured to the base part. The lower gripping body is coupled to the link pieces so as to be retractable from the upper gripping body.

2 Claims, 8 Drawing Sheets (58) Field of Classification Search
USPC .................................................. 269/228, 269
See application file for complete search history.

(56) References Cited

U.S. PATENT DOCUMENTS

| | | | | | |
|---|---|---|---|---|---|
| 1,025,739 | A | * | 5/1912 | Davis | B25B 1/2452 269/272 |
| 1,244,136 | A | * | 10/1917 | Segerdahl | F16G 3/006 24/134 N |
| 1,300,752 | A | * | 4/1919 | Mattern | A62B 1/14 182/5 |
| 1,361,643 | A | * | 12/1920 | Swisher | F16G 11/04 24/134 KB |
| 1,430,783 | A | * | 10/1922 | Knute | F16G 11/10 24/136 R |
| 1,464,939 | A | * | 8/1923 | Kearney | B66D 3/02 24/134 N |
| 1,504,087 | A | * | 8/1924 | Judson | E21B 19/12 24/136 R |
| 1,591,344 | A | * | 7/1926 | Reeves | F16G 11/10 24/134 N |
| 1,652,537 | A | * | 12/1927 | Lewis | A23G 9/283 137/595 |
| 1,942,625 | A | * | 1/1934 | Whalan | F16G 3/006 24/132 R |
| 2,140,837 | A | * | 12/1938 | Ross | H02G 1/02 24/134 N |
| 2,146,575 | A | * | 2/1939 | Hefftner | F16G 11/04 24/136 R |
| 2,194,647 | A | * | 3/1940 | Feltenberger | F16G 11/04 294/102.1 |
| 2,245,811 | A | * | 6/1941 | O'Russa | F16G 3/006 24/134 N |
| 2,330,736 | A | * | 9/1943 | Paulson | B25B 5/12 24/132 R |
| D136,818 | S | * | 12/1943 | Paulson | B25B 5/12 24/134 N |
| 2,431,819 | A | * | 12/1947 | Meyer | B60P 7/0838 24/132 R |
| 3,222,742 | A | * | 12/1965 | Persiaux | B66D 3/02 24/134 N |
| 3,262,171 | A | * | 7/1966 | Scholz | F16G 11/00 24/134 R |
| 3,599,297 | A | * | 8/1971 | Sievers | F16G 11/105 24/132 R |
| 3,672,636 | A | * | 6/1972 | Parsen | H02G 1/04 254/134.3 R |
| 3,824,653 | A | * | 7/1974 | Sholler | F16G 11/10 24/134 KB |
| 3,971,552 | A | * | 7/1976 | Mayfield | B25B 5/06 269/228 |
| 3,995,830 | A | * | 12/1976 | Desplats | B66D 3/02 254/384 |
| 4,034,828 | A | * | 7/1977 | Rose | A62B 1/14 182/5 |
| 4,077,094 | A | * | 3/1978 | Swager | A62B 1/14 182/5 |
| 4,083,438 | A | * | 4/1978 | Handa | A62B 1/14 188/65.3 |
| 4,480,816 | A | * | 11/1984 | Gortan | B66D 3/02 254/254 |
| 4,483,517 | A | * | 11/1984 | Cavalieri | B25B 25/00 226/112 |
| 4,592,117 | A | * | 6/1986 | Ruehl | H02G 7/056 24/129 R |
| 4,598,442 | A | * | 7/1986 | Luginbuhl | F16G 11/04 24/132 R |
| 5,058,869 | A | * | 10/1991 | Ruthven | B25B 7/00 269/228 |
| 5,647,046 | A | * | 7/1997 | Cowen | G02B 6/4422 385/136 |
| 8,540,215 | B2 | * | 9/2013 | Iwama | B25B 25/00 24/134 R |
| 8,720,013 | B2 | * | 5/2014 | Chen | A62B 1/14 24/132 R |
| 8,984,722 | B2 | * | 3/2015 | Shibilia | H02G 7/056 24/136 R |
| 9,160,149 | B2 | * | 10/2015 | Iwama | B25B 25/00 |
| 2012/0000037 | A1 | * | 1/2012 | Chen | B25G 1/10 24/134 N |
| 2012/0005864 | A1 | * | 1/2012 | Chen | A62B 1/14 24/132 WL |
| 2015/0232314 | A1 | * | 8/2015 | Nagaki | B66F 19/00 294/135 |
| 2015/0244154 | A1 | * | 8/2015 | Nagaki | H02G 7/056 254/134.6 |

FOREIGN PATENT DOCUMENTS

| | | |
|---|---|---|
| JP | 3-32610 | 3/1991 |
| JP | 10-94128 | 4/1998 |
| JP | 2001-177962 | 6/2001 |
| JP | 2005-89084 | 4/2005 |

* cited by examiner

WIRE GRIPPER

FIELD

The present invention relates to a wire gripper which grips an electric wire in the step of drawing an electric wire in order to cut the electric wire.

BACKGROUND

To cut an electric wire, the operator employs a wire stretcher to loosen the portion at which the electric wire is drawn and cut. In general, such a wire stretcher has an extendable telescopic shaft with ends to which a wire gripper for grasping an electric wire is coupled. Using such a wire stretcher, the wire grippers at both ends can each grip the electric wire and the telescopic shaft at the center can be contracted, thereby allowing the electric wire between both the wire grippers to be loosened in the shape of an arch. Known as a technique for gripping or grasping an electric wire is a wire gripper with a wire stretching function shown in FIG. 7 (see Patent Document 1).

Figure 7:
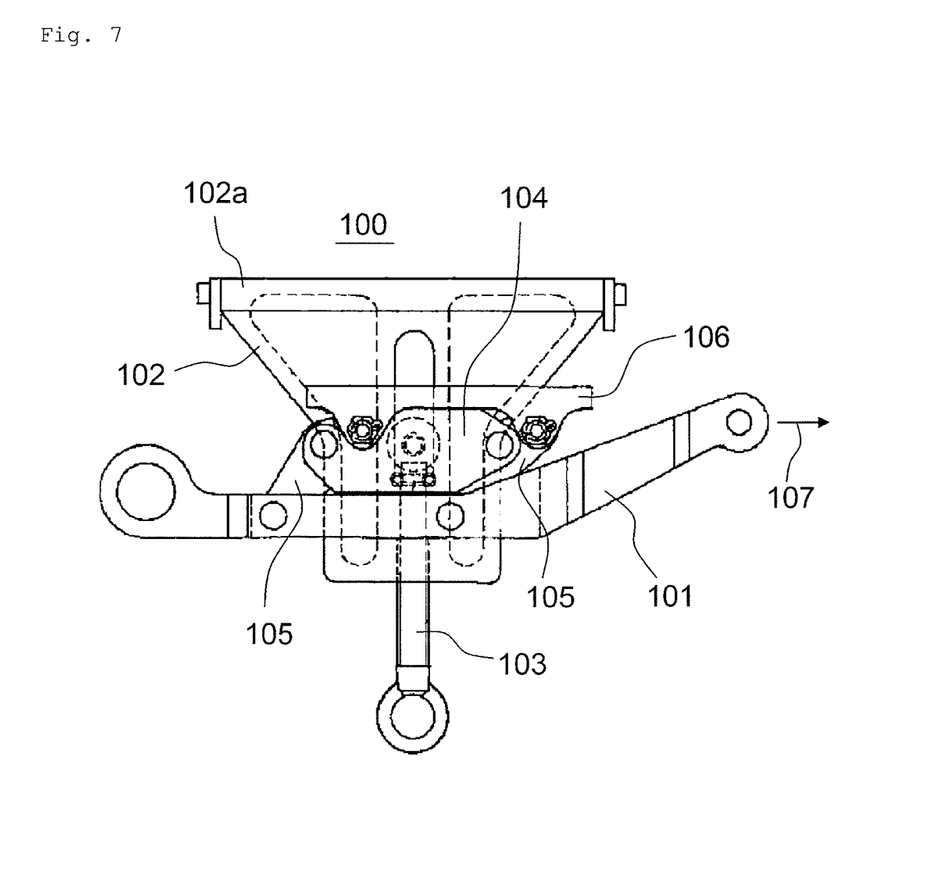
FIG. 7 is a front view illustrating a conventional wire gripper with a wire stretching function.

In FIG. 7, on the upper side of a support frame 102 of the wire gripper 100 with the wire stretching function, there is formed an electric wire receiver 102a with which the upper side of the electric wire is brought into contact. The support frame 102 is mounted so as to be slidable in the vertical direction relative to a relay member 104 by operating an operating bolt 103 that is rotatably mounted to the relay member 104 at the center.

On both sides of the relay member 104, two coupling levers 105 are pivotally supported in a swingable manner. There is also provided a coupling end member 101 via these two coupling levers 105, thus forming a parallel link mechanism. There is also provided an electric wire retainer 106 which is in contact with the lower side of the electric wire and which is coupled to an upper part of the coupling levers 105 so as to be brought into contact with or away from the electric wire receiver 102a by allowing the coupling end member 101 to operate the coupling levers 105 in a swingable manner. In such a structure, pulling the coupling end member 101 in the direction of an arrow 107 allows the electric wire to be gripped between the electric wire receiver 102a and the electric wire retainer 106.

CITATION LIST

Patent Literature

Patent Literature 1: Japanese Patent Application Laid-Open No. Hei. 10-094128

SUMMARY

Technical Problem

However, with the wire gripper 100 having the wire stretching function of FIG. 7, the sandwiching of the electric wire between the electric wire receiver 102a and the electric wire retainer 106 causes the electric wire to be squashed and thereby deformed, with the result of the sandwiching force being reduced. This will be described with reference to FIG. 8.

Figure 8:
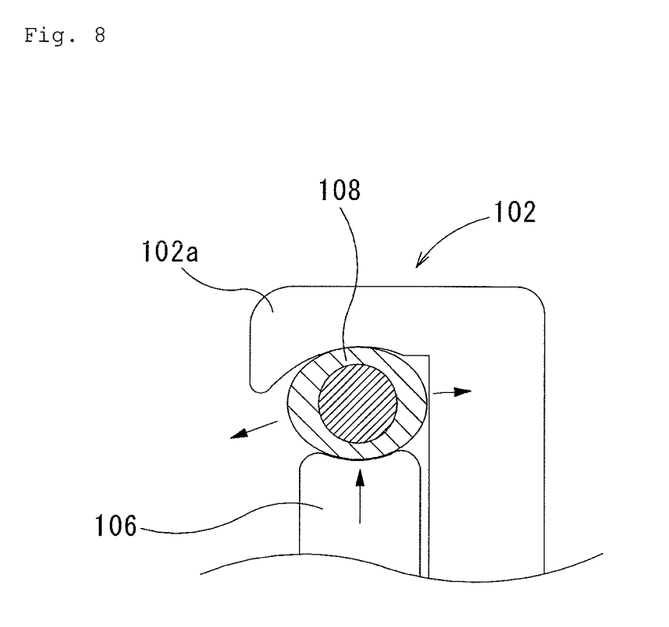
FIG. 8 is a side view of the wire gripper of FIG. 7 with a wire stretching function.

FIG. 8 is a cross-sectional view illustrating an electric wire gripped by the wire gripper 100 with the wire stretching function of FIG. 7 when viewed in the axial direction of the electric wire.

As can be seen from FIG. 8, both the electric wire receiver 102a and the electric wire retainer 106 have a recessed surface formed to be in contact with an electric wire 108, the recessed surfaces being shaped to hold with stability the upper and lower surfaces of the electric wire 108. However, due to a space formed on the lateral sides in the sandwiching condition, the electric wire 108 may be expanded sideward, so that part of the sandwiching force should be lost. Thus, to stabilize the gripping condition, by taking into account the force to be lost, the electric wire 108 has to be tightened by a sufficient sandwiching force enough to complement the force to be lost. That is, by taking deformation into account, the electric wire having a lower hardness has to be tightened with a greater force. This deformation tends to cause damage to the core wire and the sheath. Furthermore, since the sandwiching force to be generated has to be increased to sandwich the electric wire, each member of the wire gripper may be reinforced with an increase in size, resulting in an increase in weight. In the cutting work of the electric wire, such an increase of the tool in size and weight leads to degradation in operability and an increase in danger, thus causing considerable disadvantages.

In this context, it is an object of the present invention to provide a wire gripper which is capable of efficiently providing a gripping force without inviting an increase in size and weight.

Solution to Problem

In order to achieve the aforementioned object, the present invention provides a wire gripper for sandwiching a linear body in two opposing vertical directions. The wire gripper includes a first gripping body that is provided with a first gripping groove shaped to conform at least to an upper semi-circumferential surface of the linear body and with at least one mating part formed on each side of the first gripping groove; and a second gripping body that is provided with a second gripping groove shaped to conform at least to a lower semi-circumferential surface of the linear body and with a mated part formed to mate with the mating part in a manner such that the mating part and the mated part can mate with each other to such an extent that a height of a space formed by the first gripping groove and the second gripping groove is less than a width thereof.

Furthermore, in addition to the aforementioned structure, the wire gripper of the present invention is configured such that the mating part and the mated part are each provided with one array of recessed shapes and projected shapes in an alternately repeated pattern of recesses and projections.

Furthermore, in addition to the aforementioned structure, the wire gripper of the present invention is configured to include: a base part to which the first gripping body is secured; a link piece which is pivotally supported in a swingable manner by the base part and to which the second gripping body is coupled so as to be brought into contact with or away from the first gripping body in parallel thereto; and an operating part coupled to a swing end of the link piece.

Furthermore, in addition to the aforementioned structure, the wire gripper of the present invention is configured such that the second gripping body is pivotally supported by the link piece so as to be movable along an arc by the link piece being swung; and an opposing inclined surface which is extended in a direction of a movement of the second gripping body along the arc is formed between the mating part and the mated part on each of the parts.

Advantageous Effects of Invention

As described above, according to the present invention, since the first gripping body with the first gripping groove formed to conform to the upper semi-circumferential surface mates with the second gripping body with the second gripping groove formed to conform to the lower semi-circumferential surface, the mating part and the mated part mate with each other on the sides of the linear body generally at the center. This arrangement causes pressure to be applied from the first gripping body and the second gripping body to the entire perimeter of the linear body being gripped. Thus, since the pressure based on the sandwiching force is applied to the entire perimeter of the linear body without being reduced, it is possible to efficiently grip the linear body without causing damage thereto due to deformation.

Furthermore, the mating can be implemented to such an extent that the height of a space formed between the first gripping groove and the second gripping groove is less than the width. It is thus possible to grip the linear body in a preferred manner with a sufficient pressure applied thereto without being affected by variations in the outer diameter of the linear body.

Furthermore, according to the present invention, such a region on which a sufficient pressure is applied to the entire perimeter of the linear body is formed in a width along which the pattern of recesses and projections continues in the longitudinal direction. This allows the provision of a longitudinally elongated region on which a sufficient pressure is applied to the linear body.

Furthermore, according to the present invention, the operating part can be operated to thereby vary the separation between the first gripping body and the second gripping body through the link piece.

Furthermore, according to the present invention, the mating part and the mated part smoothly mate with each other along the inclined surface that is formed on each of the parts.

DESCRIPTION OF EMBODIMENTS

A description will now be made to a wire gripper according to an embodiment of the present invention with reference to the drawings. In each embodiment, like symbols will denote the same member or the same structure.

First Embodiment

Figure 1:
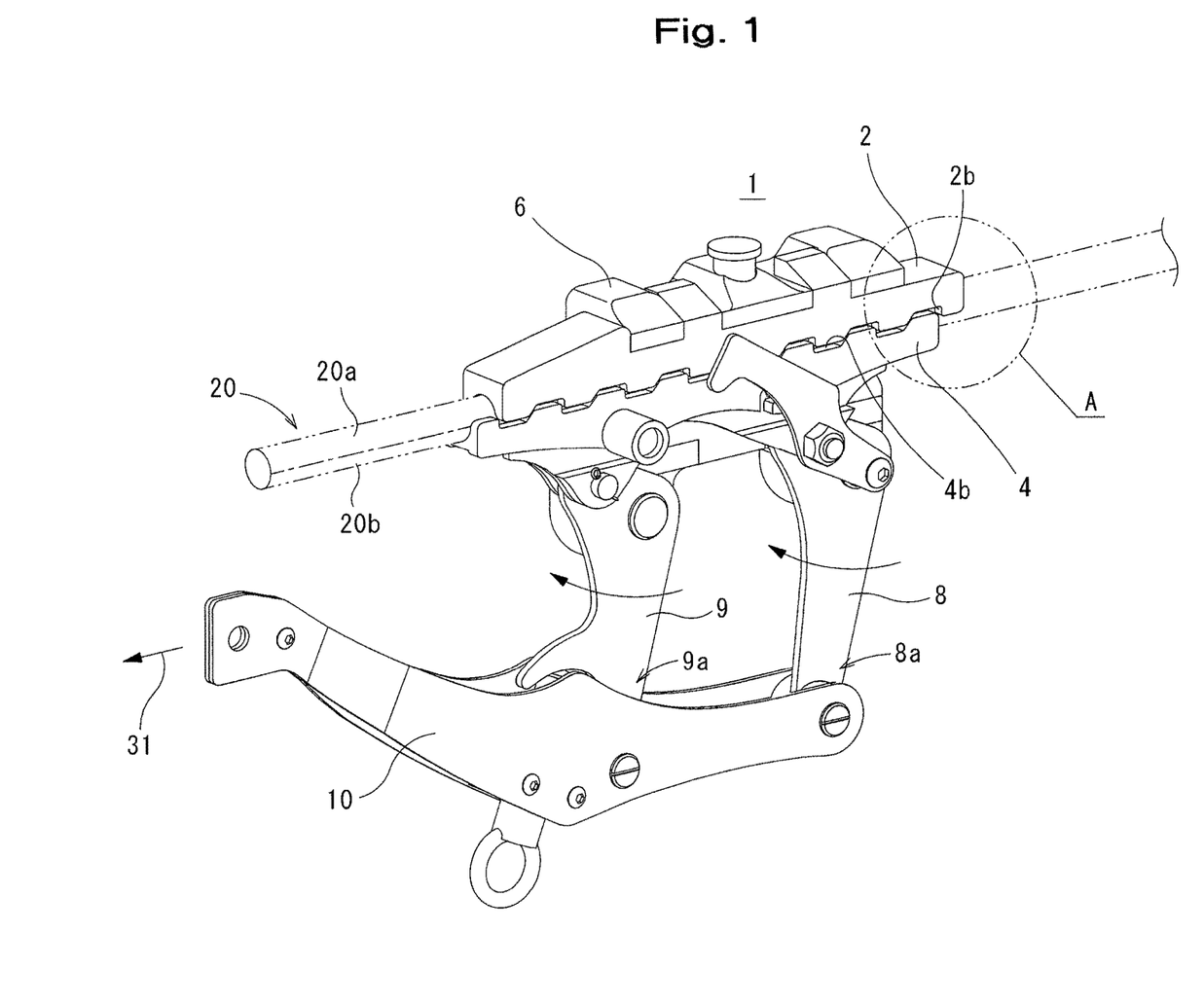
FIG. 1 is an overall perspective view illustrating a wire gripper according to a first embodiment of the present invention.

FIG. 1 is an overall perspective view illustrating a wire gripper 1 according to this embodiment. The wire gripper 1 grips a sheathed wire 20 which is illustrated by an imaginary line. The wire gripper 1 has a base part 6 which pivotally supports link pieces 8 and 9 on the lower side thereof so as to be swingable. The link pieces 8 and 9 have a swing end 8a and a swing end 9a, respectively, both of which are coupled to an operating arm 10 so as to form a parallel link mechanism.

FIG. 1 shows an upper gripping body 2 (a first gripping body) and a lower gripping body 4 (a second gripping body), by which the sheathed wire 20 is sandwiched in two vertical directions. Of the gripping bodies, the upper gripping body 2 is secured to the base part 6. The lower gripping body 4 is coupled to the link piece 8 and the link piece 9 so as to be brought into contact with or away from the upper gripping body 2.

In such a structure, pulling the operating arm 10 in the direction of an arrow 31 causes the link piece 8 and the link piece 9 to swing, whereby the lower gripping body 4 is lifted to be brought closer to the upper gripping body 2 and thereby the sheathed wire 20 is gripped.

Figure 2:
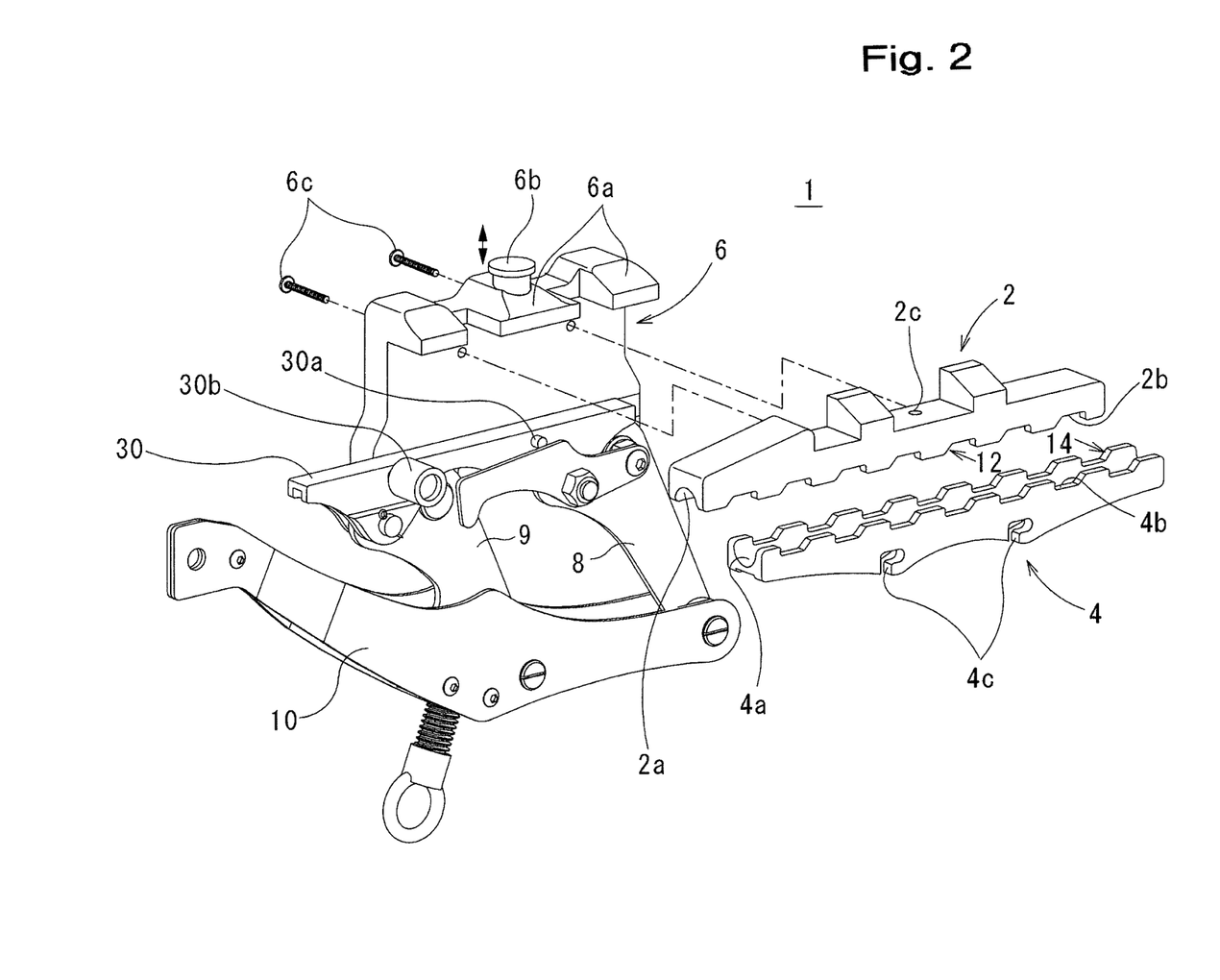
FIG. 2 is a stereoscopic exploded view illustrating the wire gripper of FIG. 1.

Here, FIG. 2 illustrates a stereoscopic exploded view of the wire gripper 1. As shown in FIG. 2, the upper gripping body 2 has a positioning hole 2c which is formed at the center of the upper surface and into which a positioning pin 6b provided on the upper part of the base part 6 so as to be vertically movable can be fitted (the tip of the pin extending downwardly is not illustrated.) Then, the upper gripping body 2 positioned by the positioning pin 6b is securely tightened by a rear bolt 6c, which is inserted from the rear side (the back of the drawing plane), to a stationary holder 6a. On the lower surface of the upper gripping body 2, there is formed an upper gripping groove 2a (a first gripping groove) to conform to an upper semi-circumferential surface 20a of the sheathed wire 20 shown in FIG. 1.

Furthermore, on both sides of the upper gripping groove 2a is formed a mating part 2b or a repetition of recessed and projected shapes (a pattern of recesses and projections). The upper gripping groove 2a and the mating part 2b, which are formed as described above, can be used to cover at least the upper semi-circumferential surface 20a of the sheathed wire 20.

In contrast to this, the lower gripping body 4 is mounted on a movable holder 30 coupled to the link piece 8 and the link piece 9. The lower gripping body 4 has a bent notch 4c formed on the lower side. The lower gripping body 4 is disposed to the movable holder 30 in a manner such that an engagement projection 30a formed on a side of the movable holder 30 is hooked to the notch 4c. The lower gripping body 4 is securely screwed with a tightening screw 30b on a side of the movable holder 30. On the upper surface of the lower gripping body 4, a lower gripping groove 4a (a second gripping groove) is formed to conform to a lower semi-circumferential surface 20b of the sheathed wire 20 shown in FIG. 1.

Furthermore, on both sides of the lower gripping groove 4a, a recessed and projected mated part 4b which mates with the mating part 2b is formed. The lower gripping groove 4a and the mated part 4b, which are formed as described above, can be used to cover at least the lower semi-circumferential surface 20b of the sheathed wire 20.

Here, take a closer look at the recessed and projected shapes of the mating part 2b and the mated part 4b in more detail. The mating part 2b has an inclined surface 12 and the mated part 4b has an inclined surface 14. These inclined surfaces 12 and 14 are formed so as to oppose to each other when the sheathed wire 20 is sandwiched.

Now, including these inclined surfaces 12 and 14, a description will be made to the recessed and projected shapes of the mating part 2b and the mated part 4b with reference to FIG. 3.

Figure 3:
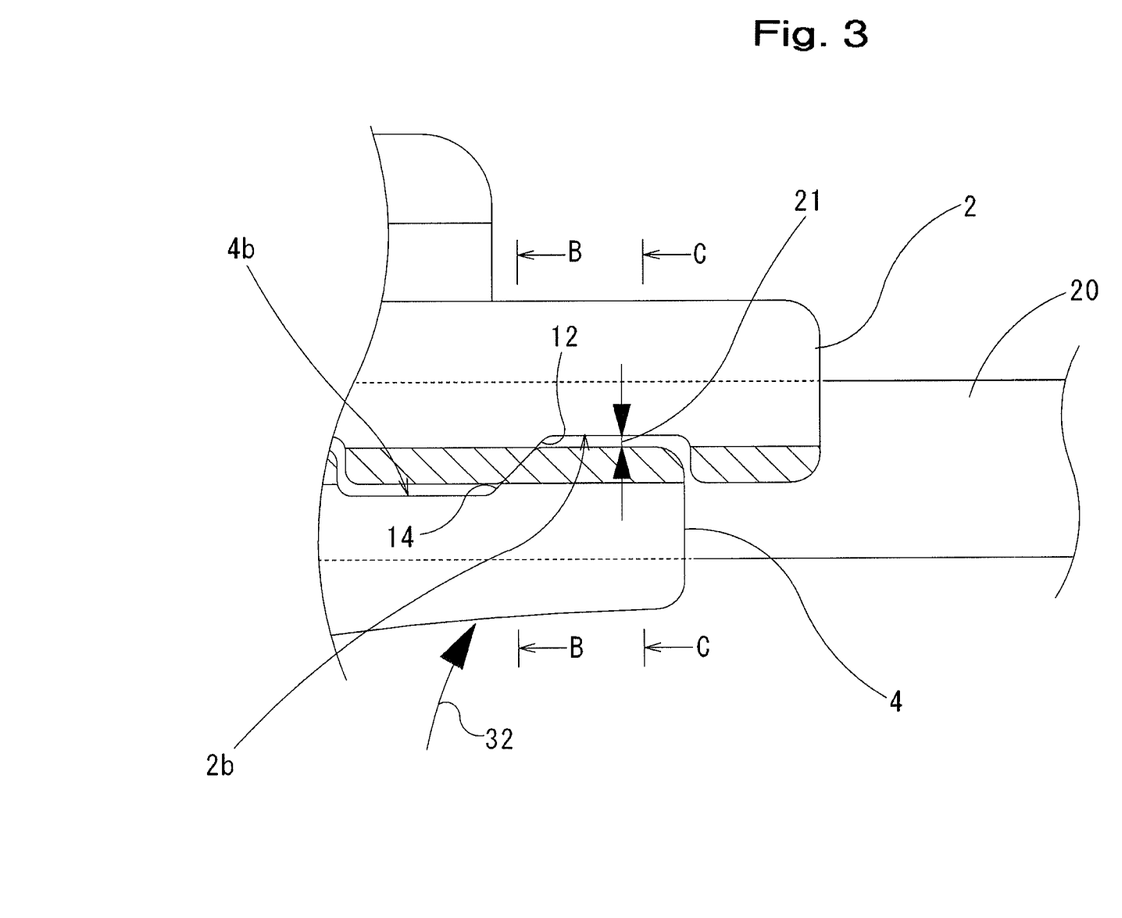
FIG. 3 is an enlarged view of a portion "A" of the wire gripper of FIG. 1.

FIG. 3 is an enlarged view of a portion "A" that is surrounded by a chain double-dashed line in FIG. 1. FIG. 3 illustrates the mating part 2b of the upper gripping body 2 and the mated part 4b of the lower gripping body 4 which mate with each other. As can be seen from FIG. 3, with the sheathed wire 20 gripped, there is a gap 21, as a tightening tolerance, which is formed between the mating part 2b and the mated part 4b.

Thus, a further increase in the sandwiching force from this state allows the further tightening of the wire while deforming the sheath. However, since the gap 21 has only a slight separation and is formed discontinuously in the longitudinal direction, the sheath will never be damaged and the core will never be deformed.

The lower gripping body 4 is displaced up and down in response to the swing of the link piece 8 and the link piece 9 and thus moved along an arc in the direction of an arrow 32 shown in FIG. 3. The inclined surface 12 and the inclined surface 14 mentioned above are formed generally in the same direction as that of the movement along the arc. Thus, in FIG. 3, the inclined surface 12 and the inclined surface 14 are almost in contact with each other. However, even if any further sandwiching force is added thereto, the separation between the upper gripping body 2 and the lower gripping body 4 can be reduced by being slid relative to each other.

FIG. 3 illustrates hatched regions which are vertically overlapped with each other due to the mating. As described above, the wire gripper 1 according to this embodiment is capable of gripping the sheathed wire 20 so as to be in contact with the entire perimeter thereof. It is thus possible to provide a high friction force between the sheathed wire 20 and the upper gripping body 2 and between the sheathed wire 20 and the lower gripping body 4, thereby holding the sheathed wire 20 with stability.

Figure 4:
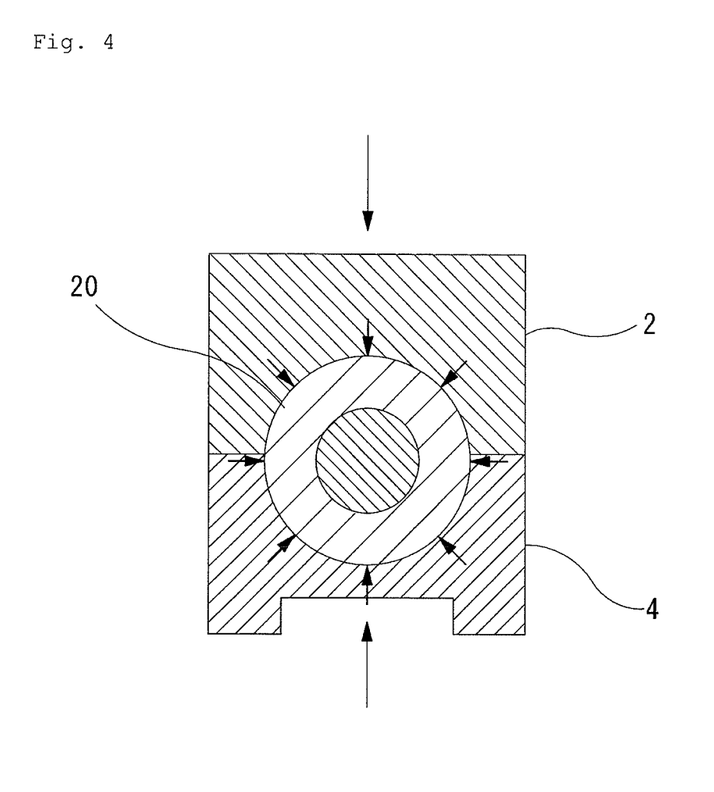
FIG. 4 is an end view taken along line B-B of FIG. 3.

A description will next be made to the sheathed wire 20 in the gripping state shown in FIG. 3 when now viewed in a different direction. FIG. 4 is an end view taken along line B-B of FIG. 3 that passes through the inclined surfaces 12 and 14.

First, with reference to FIG. 4, it can be seen that the sheathed wire 20 is gripped by the upper gripping body 2 and the lower gripping body 4 along the entire perimeter thereof. This arrangement allows the pressure based on the sandwiching force received in the vertical direction to be equally applied, without being reduced, to the entire perimeter of the sheathed wire 20.

Thus, as the outward deformation (outflow) of the sheath is prevented, and an increase in the internal pressure is reflected on the sandwiching force, a significantly large frictional force is provided. Furthermore, since a generally equal pressure is applied to the entire perimeter, the gripping state is maintained with stability.

Figure 5:
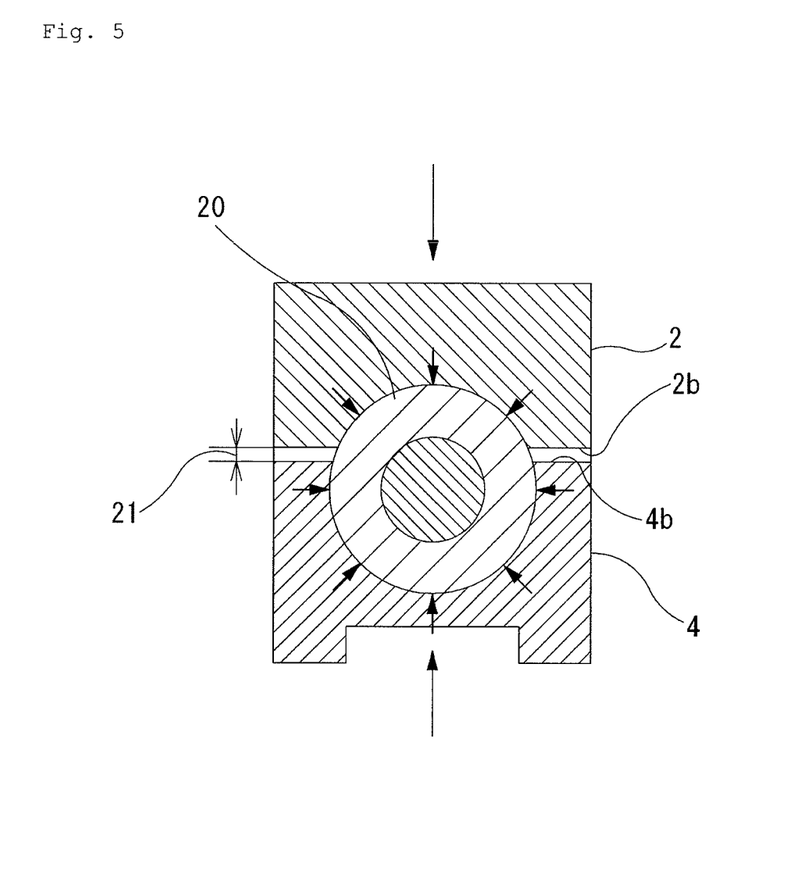
FIG. 5 is an end view taken along line C-C of FIG. 3.

Now, reference is made to FIG. 5. FIG. 5 is an end view taken along line C-C that passes through the gap 21 of FIG. 3. It can be seen that there is a gap between the upper gripping body 2 and the lower gripping body 4. This is the gap 21 shown in FIG. 3 or a tightening tolerance. That is, as in FIG. 4, in this state, the sheathed wire 20 is already gripped in a manner such that a pressure is applied to the entire perimeter from the upper gripping groove 2a and the lower gripping groove 4a (see FIG. 2). However, it is possible to further tighten the wire by the amount of the gap 21 shown in FIG. 5.

As can be seen from above, the mating part 2b and the mated part 4b are formed so that the upper gripping body 2 and the lower gripping body 4 can mate with each other to such an extent that the height of the space formed by the upper gripping groove 2a and the lower gripping groove 4a in the mating state is less than the width (in the radial direction of the sheathed wire 20).

That is, with variations in the outer diameter of the sheathed wire 20, the separation between the upper gripping body 2 and the lower gripping body 4 can be controlled, at a portion at which the inclined surfaces 12 and 14 are in contact with each other, to such a position at which a sufficient sandwiching force can be provided while the entire perimeter is kept being gripped (see FIG. 4).

Note that the separation of the gap 21 has to be set by considering the hardness of the sheath material so that the pressure applied from the upper gripping groove 2a and the lower gripping groove 4a to the sheathed wire 20 does not escape outwardly due to the deformation of the sheath. That is, the separation of the gap 21 is preferably reduced to such an extent that the deformation of the sheath material and the core can be almost ignored. Thus, within the range of deformation not causing damage to the sheath material and the core, it is possible to actively allow the outwardly expanded portion to operate as a gripped portion.

As discussed above, the wire gripper 1 according to this embodiment is capable of gripping generally the entire perimeter of the sheathed wire 20, thereby providing an increased contact area and advantages of preventing axial displacement. Thus, for the same sandwiching force, the force for gripping the sheathed wire 20 is considerably increased as compared with the conventional structure that allows contacts only in the two vertical directions. In other words, to provide a required gripping force, only a sandwiching force less than the conventional force has to be generated. Thus, this contributes to an improvement in safety as well as a reduction in damage to the sheath.

Furthermore, the upper gripping body 2 and the lower gripping body 4 are constructed to be detachable. Thus, for the sheathed wire 20 having different diameters beyond the range of variations, those members with the upper gripping groove 2a and the lower gripping groove 4a having different inner diameters may be employed with flexibility.

Second Embodiment

Figure 6:
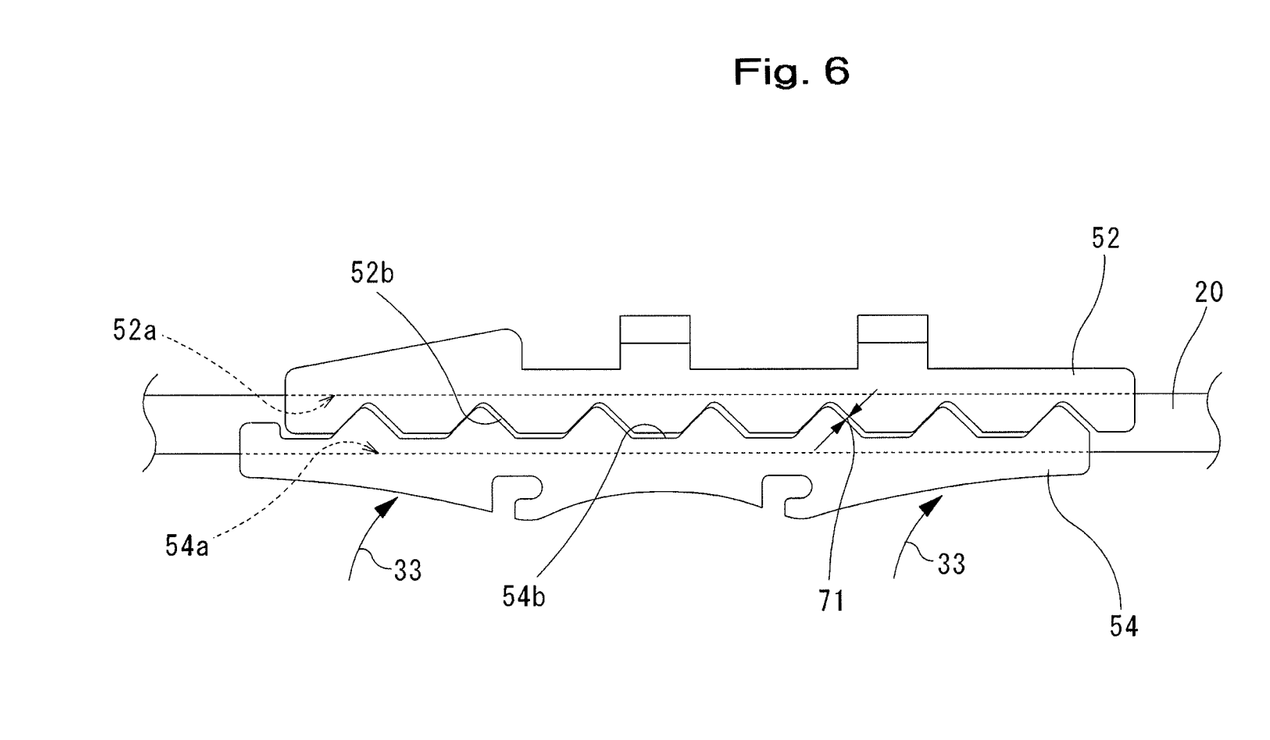
FIG. 6 is a side view illustrating a gripping state by the upper gripping body and the lower gripping body of a wire gripper according to a second embodiment of the present invention.

Now, referring to the drawings, a description will be made to a wire gripper according to a second embodiment of the present invention. FIG. 6 illustrates an upper gripping body 52 and a lower gripping body 54 mating with each other in the wire gripper of this embodiment. Here, for the sake of convenience of description, the same components as those of the first embodiment are not illustrated.

As shown in FIG. 6, the sheathed wire 20 is sandwiched between an upper gripping groove 52a formed on the lower surface of the upper gripping body 52 and a lower gripping groove 54a formed on the upper surface of the lower gripping body 54. In this state, like the wire gripper 1 of the first embodiment, a mating part 52b of the upper gripping body 52 and a mated part 54b of the lower gripping body 54 overlap with each other in the vertical direction. There is also formed a gap 71 as a tightening tolerance.

Thus, like the wire gripper 1 shown in FIG. 1 in the first embodiment, the wire gripper according to this embodiment is also capable of gripping the sheathed wire 20 so as to apply pressure to the entire perimeter thereof as well as flexibly coping with variations in the outer diameter of the sheathed wire 20.

This embodiment is also configured such that the opposing inclined surfaces formed on the portion at which the mating part 52b and the mated part 54b are in contact with each other are formed generally in the direction of an arrow 33 that indicates the arc track of the lower gripping body 54.

Note that for each of the aforementioned embodiments, such a structure has been illustrated as an example in which the upper gripping body 2 or 52 is detachable from the base part 6. However, the invention is not limited thereto. The upper gripping body 2 or 52 may also be integrally molded with the base part 6.

Furthermore, for the wire gripper 1 shown in FIG. 1 according to the first embodiment mentioned above, such an example has been illustrated in which the link mechanism is made up of the two link pieces 8 and 9. However, so long as the upper gripping body 2 and the lower gripping body 4 can be brought into contact with or away from each other while being kept generally in parallel to each other, the link mechanism may also be made up of one link piece.

Furthermore, in each of the aforementioned embodiments, such a structure has been illustrated as an example in which the upper gripping body 2 or 52 is securely fixed and the lower gripping body 4 or 54 is set to be movable. However, the link piece may be extended upwardly and the upper gripping body may be coupled to the extended link piece with the lower gripping body secured to the base part 6.

Furthermore, in each of the aforementioned embodiments, such a structure has been illustrated as an example in which the lower sides of the link pieces 8 and 9 are swingable. However, the swinging end may be extended above the base part 6, so that the lower gripping body 4 or 54 may be swung at an upper side.

Furthermore, in each of the aforementioned embodiments, such a structure has been illustrated as an example in which the mating part 2b or 52b and the mated part 4b or 54b are both formed along the entire range of the upper gripping body 2 or 52 and the lower gripping body 4 or 54 in the longitudinal direction. However, the same effects can be provided if the mating part and the mated part are formed at least at one location.

More specifically, either one of the upper gripping body and the lower gripping body may only have to be provided with a projected part, while the other may be provided with a recessed part, and opposing inclined surfaces may be formed on each of the parts in the direction of motion of the movable gripping body. Then, the projected part and the recessed part may also only have to be formed to mate with each other so that the height of the space formed by mating the upper gripping body and the lower gripping body is less than the width. This allows the provision of the same effects as those provided by the structure according to each embodiment illustrated above.

REFERENCE SIGNS LIST 1 wire gripper
2, 52 upper gripping body (first gripping body)
2a, 52a upper gripping groove (first gripping groove)
2b, 52b mating part
2c positioning hole
4, 54 lower gripping body (second gripping body)
4a, 54a lower gripping groove (second gripping groove)
4b, 54b mated part
4c notch
6 base part
6a stationary holder
6b positioning pin
6c rear bolt
8, 9 parallel link piece (link piece)
8a, 9a swing end
10 operating arm
12, 14 inclined surface
20 sheathed wire (linear body)
20a upper semi-circumferential surface
20b lower semi-circumferential surface
21, 71 gap
30 movable holder
30a engagement projection
30b tightening screw
31, 32, 33 arrow

The invention claimed is:

1. A wire gripper for sandwiching a linear body in two opposing vertical directions, the wire gripper comprising:
a first gripping body that is provided with a first gripping groove defined by a first circular arc surface that is shaped to conform at least to an upper semi-circumferential surface of the linear body and with at least one mating part formed on each side of the first gripping groove; and
a second gripping body that is provided with a second gripping groove defined by a second circular arc surface that is shaped to conform at least to a lower semi-circumferential surface of the linear body and with a mated part formed to mate with the mating part in a manner such that the mating part and the mated part can mate with each other to such an extent that a height of a space formed by the first gripping groove and the second gripping groove is less than a width thereof,
the mating part and the mated part each being provided with an array of recessed shapes and projected shapes in an alternately repeated pattern of recesses and projections,
wherein the recessed shapes and projected shapes of each of the mating part and the mated part are at least partially defined by inclined surfaces,
wherein the inclined surfaces that at least partially define the mating part are spaced apart from a bottom of the first circular arc surface with respect to a sandwiching direction of the linear body,
wherein the inclined surfaces that at least partially define the mated part are spaced apart from a bottom of the second circular arc surface with respect to the sandwiching direction of the linear body, and
wherein the inclined surfaces that at least partially define the mating part and the inclined surfaces that at least partially define the mated part are configured to contact each other;
a base part to which the first gripping body is secured;
a link piece which is pivotally supported in a swingable manner by the base part and to which the second gripping body is coupled so as to be brought into contact with or away from the first gripping body in parallel thereto;
an operating part coupled to a swing end of the link piece;

the second gripping body is pivotally supported by the link piece so as to be movable along an arc by the link piece being swung;

wherein the inclined surfaces that at least partially define the mating part oppositely face the inclined surfaces that at least partially define the mated part, wherein the inclined surfaces of both the mating part and mated part are inclined in a direction that is transverse to a longitudinal direction and a width direction of both the first gripping body and second gripping body, wherein the inclined surfaces that at least partially define the mating part and the inclined surfaces that at least partially define the mated part are configured to make surface contact with each other in a state where the wire gripper sandwiches the linear body.

2. The wire gripper according to claim 1, wherein, when oppositely facing inclined surfaces of the mating part and mated part are in contact, there is a gap formed between horizontal surfaces of the mating part and mated part in a direction of sandwiching the linear body.

* * * * *